US009567987B2

(12) United States Patent
Wang

(10) Patent No.: US 9,567,987 B2
(45) Date of Patent: Feb. 14, 2017

(54) CHAMBER FLUID REMOVAL SYSTEM

(71) Applicant: ROLLS-ROYCE PLC, London (GB)

(72) Inventor: Yi Wang, Nottingham (GB)

(73) Assignee: ROLLS-ROYCE plc, London (GB)

( * ) Notice: Subject to any disclaimer, the term of this patent is extended or adjusted under 35 U.S.C. 154(b) by 252 days.

(21) Appl. No.: 14/157,921

(22) Filed: Jan. 17, 2014

(65) Prior Publication Data
US 2014/0248125 A1    Sep. 4, 2014

(30) Foreign Application Priority Data

Mar. 1, 2013   (GB) .................................. 1303636.3

(51) Int. Cl.
| F01D 11/06 | (2006.01) |
| F04B 23/08 | (2006.01) |
| F02C 7/06 | (2006.01) |
| F01D 25/18 | (2006.01) |
| F01D 9/06 | (2006.01) |
| F01D 25/20 | (2006.01) |

(Continued)

(52) U.S. Cl.
CPC ............... *F04B 23/08* (2013.01); *F01D 9/065* (2013.01); *F01D 25/183* (2013.01); *F01D 25/20* (2013.01); *F02C 7/06* (2013.01); *F01D 25/16* (2013.01); *F01M 2001/0207* (2013.01); *F02C 7/28* (2013.01); *F05D 2260/601* (2013.01); *F05D 2260/98* (2013.01); *Y10T 137/0391* (2015.04); *Y10T 137/85978* (2015.04)

(58) Field of Classification Search
CPC ........ F01D 25/20; F01D 25/183; F01D 25/16; F01D 25/18; F01D 9/065; F01M 2001/0207; F01M 1/02; F04B 23/08; F05D 2260/601; F05D 2260/98; Y10T 137/0391; Y10T 137/85978; F02C 7/06; F02C 7/28; F16N 31/00; F16N 7/40
See application file for complete search history.

(56) References Cited

U.S. PATENT DOCUMENTS 2,571,166 A * 10/1951 Rossetto ................. F01D 25/18
                                                        184/6.11
3,527,054 A *  9/1970 Hemsworth ............ F01D 11/04
                                                        184/6.11
(Continued)

FOREIGN PATENT DOCUMENTS

EP      0 626 503 A1    11/1994
EP      0 692 066 B1     6/1997
(Continued)

OTHER PUBLICATIONS

Search Report issued in European Patent Application No. 14 15 1557 dated May 7, 2014.
(Continued)

*Primary Examiner* — Peter J Bertheaud
*Assistant Examiner* — Dominick L Plakkoottam
(74) *Attorney, Agent, or Firm* — Oliff PLC

(57) ABSTRACT

A chamber fluid removal system including a pump and an ejector is disclosed. The system is arranged in use to pump fluid from a chamber using the pump and deliver it to the ejector as a motive fluid and the system being further arranged to draw fluid from the chamber or from a second chamber as an entrained fluid by entraining it using the ejector and the motive fluid.

9 Claims, 3 Drawing Sheets

(51) Int. Cl.
*F02C 7/28* (2006.01)
*F01D 25/16* (2006.01)
*F01M 1/02* (2006.01)

(56) References Cited

U.S. PATENT DOCUMENTS

| | | | |
|---|---|---|---|
| 3,612,083 A | 10/1971 | Kronk | |
| 3,722,624 A * | 3/1973 | Buckland | F01D 25/183 184/6.11 |
| 4,431,372 A | 2/1984 | Dadhich | |
| 5,046,306 A * | 9/1991 | Borre, Jr. | F01D 25/18 184/6.11 |
| 5,429,208 A * | 7/1995 | Largillier | F01D 25/20 184/6.11 |
| 5,494,355 A * | 2/1996 | Haase | F01D 9/065 384/135 |
| 5,611,661 A * | 3/1997 | Jenkinson | F01D 25/183 184/6.11 |
| 7,584,619 B2 * | 9/2009 | Granitz | F01D 25/20 184/6.4 |
| 8,491,273 B2 * | 7/2013 | Liberg | B63B 13/00 114/121 |
| 9,150,290 B2 * | 10/2015 | Liberg | B63B 13/00 |
| 2008/0308355 A1 | 12/2008 | Kakinami et al. | |
| 2010/0037855 A1 * | 2/2010 | French | F01D 25/16 123/323 |
| 2010/0104452 A1 * | 4/2010 | Liberg | F04F 5/48 417/54 |
| 2014/0096533 A1 * | 4/2014 | Homeyer | F01D 25/183 60/778 |

FOREIGN PATENT DOCUMENTS

| | | |
|---|---|---|
| EP | 2 053 206 A2 | 4/2009 |
| FR | 2 961 856 A1 | 12/2011 |
| JP | A-2011-58544 | 3/2011 |
| WO | WO 94/23184 A1 | 10/1994 |

OTHER PUBLICATIONS

Search Report issued in British Patent Application No. GB1303636.3 dated Aug. 3, 2013.

* cited by examiner

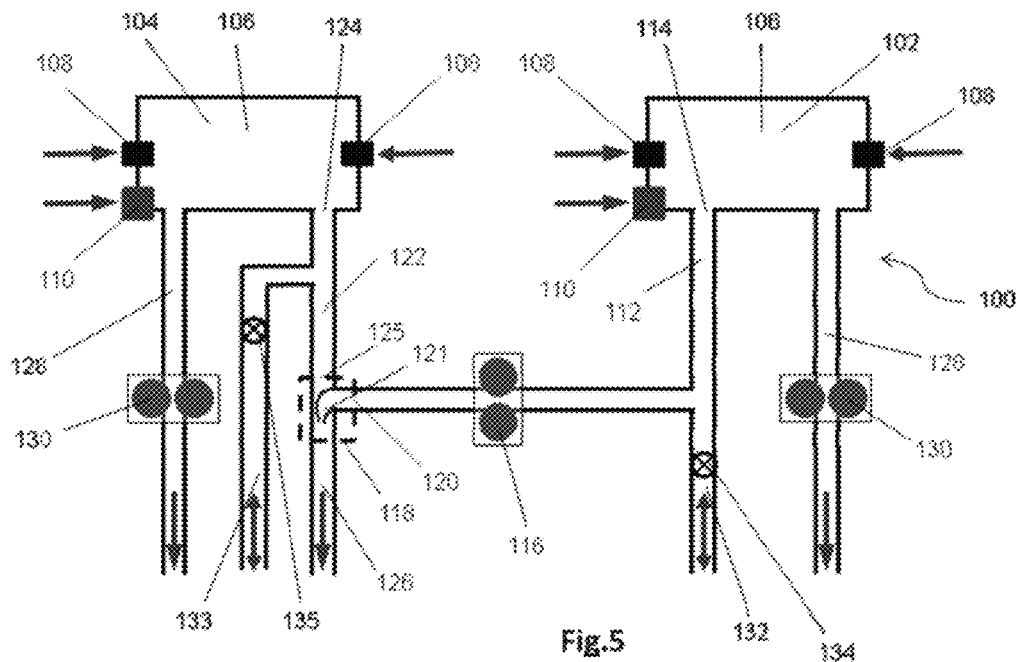
Fig.5
Fig.6
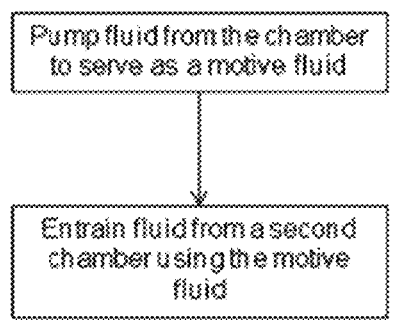

CHAMBER FLUID REMOVAL SYSTEM

The present invention relates to a chamber fluid removal system, a gas turbine engine and methods of removing fluid from one or more chambers.

For simplicity background to the invention is explained with reference to bearing chambers as may be found in aircraft gas turbine engines containing bearings that support the rotation of an engine shaft. Although the invention may have particular relevance to such bearing chambers it is not intended to be limited to such applications.

Bearing chambers are provided in order that lubricating oil can be introduced around the bearings. To limit leakage of the oil, the bearing chambers have seals between the shaft and the chamber. There is however potential for leakage of oil via these seals and there may also be leakage via static joints of the bearing chamber. Typically air bled from the engine compressor is used to keep the pressure outside of the bearing chamber higher than the pressure within it (i.e. a positive pressure differential). In most cases therefore there is a continuous flow of air inwards through the leakage paths, preventing the leakage of oil. Nonetheless under certain engine operating conditions (both steady-state and transient) the pressure surrounding the bearing chambers is insufficient and the pressure differential reverses, allowing leakage of oil.

Oil that leaks from the bearing chamber could cause an engine fire and is therefore a hazard to safe engine operation. Further the oil may contaminate the core airflow of the engine. When gas turbine engines are installed in aircraft, a proportion of the core airflow is typically taken to supply breathable air to the crew and passengers. Contamination of cabin air with oil fumes and smoke has long been recognised as undesirable.

An alternative approach to maintaining a supply of high pressure air to a region around the chamber is to remove air from the chamber itself. This may be achieved using an ejector utilising compressor bled air as a motive fluid to entrain fluid from the bearing chamber. Nonetheless compressor bleed air may remain inadequate as a motive fluid especially at low power engine operations including sub-idle. Further at high power engine operation, where compressor bleed air pressure is adequate, the high temperature of the air may pose a fire hazard.

According to a first aspect of the invention a chamber fluid removal system is provided comprising optionally a pump and optionally an ejector, the system being optionally arranged in use to pump fluid from a chamber using the pump and optionally deliver it to the ejector as a motive fluid and the system being further optionally arranged to draw fluid from the chamber or from a second chamber as an entrained fluid by optionally entraining it using the ejector and the motive fluid.

With the motive fluid originating from the chamber itself, the need for provision of an external high pressure source (e.g. compressor bleed air) is removed, thus potentially improving safety and potentially reducing the extent of piping needed for motive fluid delivery. The pump therefore has dual functions, pumping a quantity of fluid from the chamber and providing high pressure fluid to draw further fluid from the chamber or the second chamber via the ejector. Advantageously (in comparison with the use of compressor bleed air), the speed of the pump may be controlled such that the interior of the chamber (and where provided the second chamber) is always at a lower pressure than its surroundings, regardless of variation in engine performance parameters.

In some embodiments the fluid pumped from the chamber for use as the motive fluid passes through a motive fluid line arranged in use to be in fluid communication with the chamber, the pump and a motive fluid port of the ejector.

In some embodiments the pump is positioned intermediate the chamber and the ejector.

In some embodiments the entrained fluid drawn from the chamber or second chamber using the ejector and motive fluid passes through an entrained fluid line arranged in use to be in fluid communication with the chamber or second chamber from which the fluid is drawn and an entrained fluid port of the ejector.

In some embodiments the ejector has a fluid outlet in fluid communication with a fluid exhaust path.

In some embodiments a fluid bypass is provided arranged in use to be in fluid communication with the chamber and the fluid exhaust path. Fluid communication between the chamber and the fluid exhaust path may be via the entrained fluid line.

In some embodiments the fluid exhaust path is connected to atmosphere via a fluid separation device. The fluid separation device may for example be a breather.

In alternative embodiments a fluid bypass is provided arranged in use to be in fluid communication with the chamber and a bypass exhaust separate to the fluid exhaust path. As will be appreciated the bypass exhaust may be connected to atmosphere via a fluid separation device. The fluid separation device may for example be a breather.

In some embodiments a valve is provided in the fluid bypass. The valve could for example be controlled by a computer system (such as an electronic engine controller) to open and close the bypass. When the bypass is open the pump and ejector may be bypassed, such that fluid may flow freely in either direction.

This may be advantageous when the pressure differential between the interior and exterior of the chamber as generated by the pump is too great. This may for example occur where sealing of the chamber is sufficient such that the pump progressively evacuates the chamber to an extent that the seals and/or pump may be damaged. This may occur where the seals are relatively new. With the fluid bypass open, fluid may flow from atmosphere through the fluid exhaust path or bypass exhaust (whichever is present), through the fluid bypass and entrained fluid line and into the motive fluid line for pumping.

Opening of the fluid bypass may also be useful where in order for the interior chamber pressure to be further reduced additional flow capacity is required. This may be necessary where for example chamber sealing is relatively poor (e.g. the seals are deteriorated). In this case the open fluid bypass may provide additional flow capacity for the removal of fluid from the chamber.

In some embodiments the entrained fluid is drawn from the chamber. In this case both the entrained fluid and the fluid pumped from the chamber for use as the motive fluid come from the same chamber. With this system the total fluid flow from the chamber is increased as both pumped and entrained fluid are removed.

In some embodiments the fluid pumped from the chamber by the pump for use as the motive fluid leaves the chamber via a motive fluid outlet connected to the motive fluid line and the entrained fluid drawn from the chamber leaves the chamber via an entrained fluid outlet connected to the entrained fluid line.

In some embodiments the entrained fluid and the fluid pumped from the chamber by the pump for use as the motive fluid leave the chamber via a common fluid outlet connected to a common fluid line.

In some embodiments the motive fluid line and entrained fluid line are connected to the common fluid line at a bifurcation point.

In some embodiments the bifurcation point is intermediate the common fluid outlet and the pump.

In some embodiments the entrained fluid is drawn from the second chamber. This may allow the removal of fluid from two or more chambers via an interlinked system.

In some embodiments the system further comprises a second pump and a second ejector, the system being arranged in use to pump fluid from the second chamber using the second pump and deliver it to the second ejector as a second motive fluid and the system being further arranged to draw fluid from a third chamber as a second entrained fluid by entraining it using the second ejector and the second motive fluid In some embodiments the fluid pumped from the second chamber for use as the second motive fluid passes through a second motive fluid line arranged in use to be in fluid communication with the second chamber, the second pump and a second motive fluid port of the second ejector.

In some embodiments the second entrained fluid drawn from the third chamber using the second ejector and second motive fluid passes through a second entrained fluid line arranged in use to be in fluid communication with the third chamber and a second entrained fluid port of the second ejector.

In some embodiments fluid communication of the second motive fluid line with the second chamber is via the entrained fluid line.

In some embodiments the fluid is at least partially air. The fluid may contain traces of other fluids (e.g. liquid oil, although this may be primarily removed from the chamber via a separate scavenge system).

In some embodiments the chamber s a bearing chamber arranged for use in a gas turbine engine.

In some embodiments the second chamber is a bearing chamber arranged for use in a gas turbine engine.

In some embodiments the gas turbine engine is arranged for use in an aircraft.

According to a second aspect of the invention there is provided a gas turbine engine comprising one or more chamber fluid removal systems according to the first aspect.

According to a third aspect of the invention there is provided a method of removing fluid from a chamber having one or more leakage paths between an interior of the chamber and an exterior of the chamber, the method comprising the steps of:
  a) pumping fluid from the chamber to serve as a motive fluid; and
  b) entraining further fluid from the chamber using the motive fluid.

According to a fourth aspect of the invention there is provided a method of removing fluid from a chamber, having one or more leakage paths between an interior of the chamber and an exterior of the chamber, and a second chamber having one or more leakage paths between an interior of the second chamber and an exterior of the second chamber, the method comprising the steps of:
  a) pumping fluid from the chamber to serve as a motive fluid; and
  b) entraining fluid from the second chamber using the motive fluid.

According to a fifth aspect of the invention a chamber fluid removal system is provided comprising optionally a pump and optionally an ejector, the system being optionally arranged in use to pump fluid from a chamber using the pump and optionally deliver it to the ejector as a motive fluid and the system being further optionally arranged to draw fluid from the chamber as an entrained fluid by optionally entraining it using the ejector and the motive fluid.

The skilled person will appreciate that a feature described in relation to any one of the above aspects of the invention may be applied mutatis mutandis to any other aspect of the invention.

BRIEF DESCRIPTION OF THE DRAWINGS

Embodiments of the invention will now be described by way of example only, with reference to the Figures, in which:

FIG. 5 is a schematic view showing a chamber fluid removal system for multiple chambers according to an embodiment of the invention:

FIG. 6 is a flow diagram a method according to an embodiment of the invention.

Figure 1:
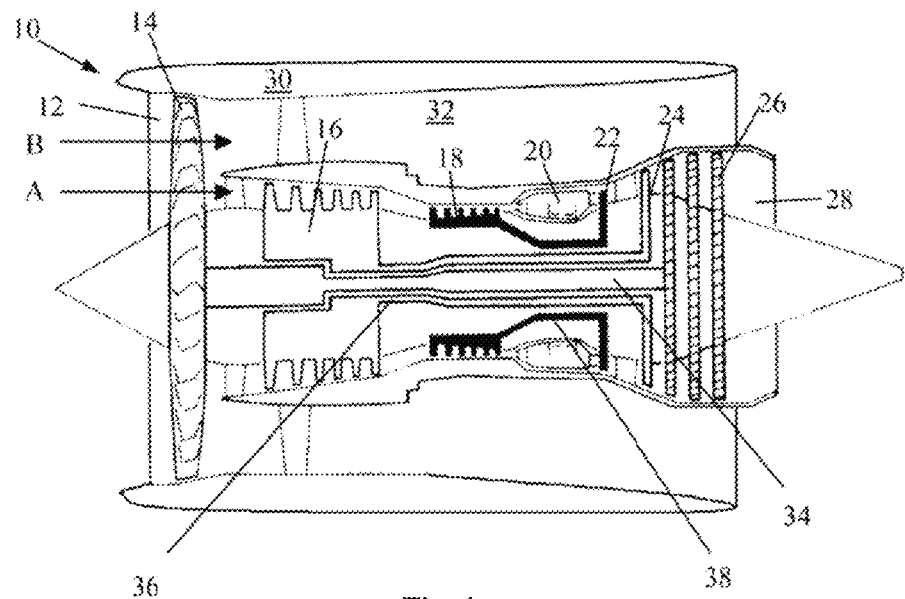
FIG. 1 is a sectional side view of as turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

The propulsive fan 14 and low pressure turbine 26 are operatively linked by a low pressure shaft 34, the intermediate pressure compressor 16 and intermediate pressure turbine 24 by an intermediate pressure shaft 36 and the high pressure compressor 18 and high pressure turbine by a high pressure shaft 38.

Figure 2:
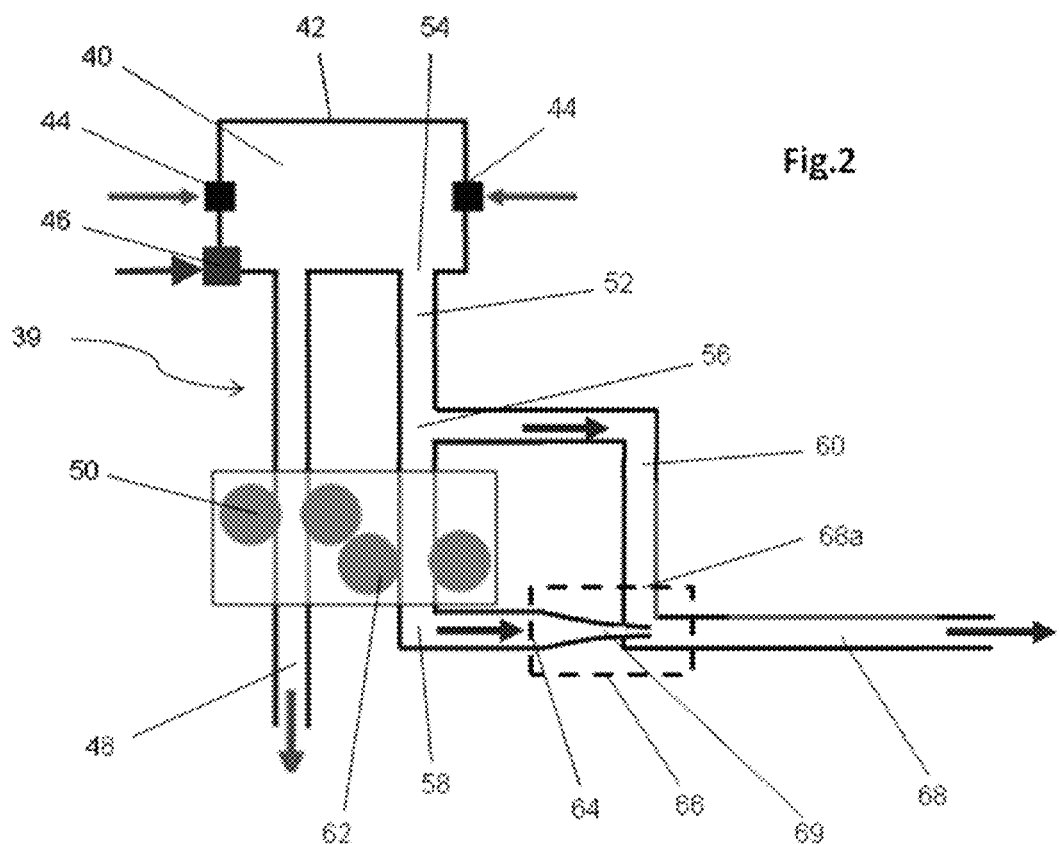
FIG. 2 is a schematic view showing a chamber fluid removal system according to an embodiment of the invention.

Each shaft 34, 36, 38 is supported by a one or more sets of bearings (not shown) such that it may rotate. Referring now to FIG. 2 a chamber fluid removal system is generally shown at 39. Each set of bearings is contained within the interior of a bearing chamber 40. The relevant shaft 34, 36, 38 passes through the walls 42 of the bearing chamber 40 containing the bearings that support it. Seals 44 are provided between the relevant shaft 34, 36, 38 and the walls 42. In this embodiment the chamber 40 also has static joints 46 in the walls 42.

Extending from the chamber 40, and in fluid communication with its interior, is a scavenge line 48 containing a scavenge pump 50.

Separate to the scavenge line 48, a vent line 52 extends from the chamber 40 at a chamber outlet 54. The vent line 52 connects to a bifurcation point 56. Connected to and extending from the bifurcation point are a motive fluid line 58 and an entrained fluid line 60 in parallel. The motive fluid line 58 contains a pump 62 and extends to and is connected with a motive fluid port 64 of an ejector 66. The entrained fluid line 60 extends between the bifurcation point 56 and an entrained fluid port 68a of the ejector 66 (to which it is connected). The ejector 66 is also provided with a fluid outlet (not shown), to which is connected a fluid exhaust path 68 terminated with a breather (not shown).

By means of the chamber outlet 54, vent line 52, motive fluid line 58 and motive fluid port 64, the interior of the chamber 40, the pump 62 and ejector 66 are in fluid communication. This is a first fluid communication path. Further, by means of the chamber outlet 54, vent line 52, entrained fluid line 60 and entrained fluid port 68a, the chamber 40 and ejector 66 are also in fluid communication. This is a second fluid communication path. Because the motive fluid line 58 and entrained fluid line 60 are supplied with fluid via the same vent line 52, the vent line may be considered a common fluid line and the chamber outlet 54 may be considered a common outlet. Nonetheless as will be appreciated, in other embodiments the motive fluid line 58 and entrained fluid line 60 may be connected independently to the chamber 40 via a motive fluid outlet and an entrained fluid outlet respectively.

In use the chamber fluid removal system 39 is used to remove fluid from the chamber 40, so as to lower the internal pressure of the chamber 40 with respect to the pressure external to the chamber 40. In this way a constant flow of air from outside to inside the chamber 40 may be achieved, thus reducing or preventing the leakage of oil from the inside to the outside of the chamber 40 via the seals 44 and/or static joints 46.

Fluid is removed from the chamber 40 via the chamber outlet 54 and vent line 52. A proportion of this fluid (to be delivered to the ejector 66 as a motive fluid) passes along the motive fluid line 58 driven by the pump 62. This fluid enters the ejector 66 via the motive fluid port 64 driven by the pump 62. Inside the ejector 66 the motive fluid passes through a convergent nozzle 69, increasing its velocity and reducing the pressure in the entrained fluid line 60. This draws an entrained fluid through the chamber outlet 54 and vent line 52, through the entrained fluid line 60 and into the ejector 66. The entrained fluid is the remaining proportion of the fluid not passing into the motive fluid line 58 at the bifurcation point 56. The velocity of the now mixed motive fluid and entrained fluid is reduced and the pressure increased. Thereafter the fluid passes along the fluid exhaust path 68 and is vented to atmosphere via the breather (not shown). The pump 62 therefore serves a double purpose. It removes a quantity of fluid from the chamber 40 via the motive fluid line 58 in accordance with the pump's capacity and it supplies motive fluid to ejector 66 to entrain further fluid from the chamber 40 via entrained fluid line 60. The net effect is increased fluid removal from the chamber 40 without the need to employ an external source of high pressure fluid to serve as a motive fluid.

The degree of pumping performed by the pump 62 may be altered as required. Further the pump may be one of any suitable arrangement, including mechanically or electrically driven configurations.

Oil dispensed in the chamber 40 to lubricate and cool the bearings is partially retrieved via the scavenge line 48, motivated by the scavenge pump 50. The remaining proportion of the oil may however leave the chamber 40 via the chamber outlet 54.

Figure 3:
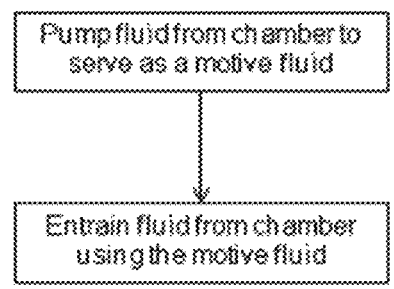
FIG. 3 is a flow diagram of a method according to an embodiment of the invention.

With reference to FIG. 3, the chamber fluid removal system 39 performs a method comprising the steps of pumping fluid from the chamber 40 to serve as a motive fluid and entraining further fluid from the chamber 40 using the motive fluid.

Figure 4:
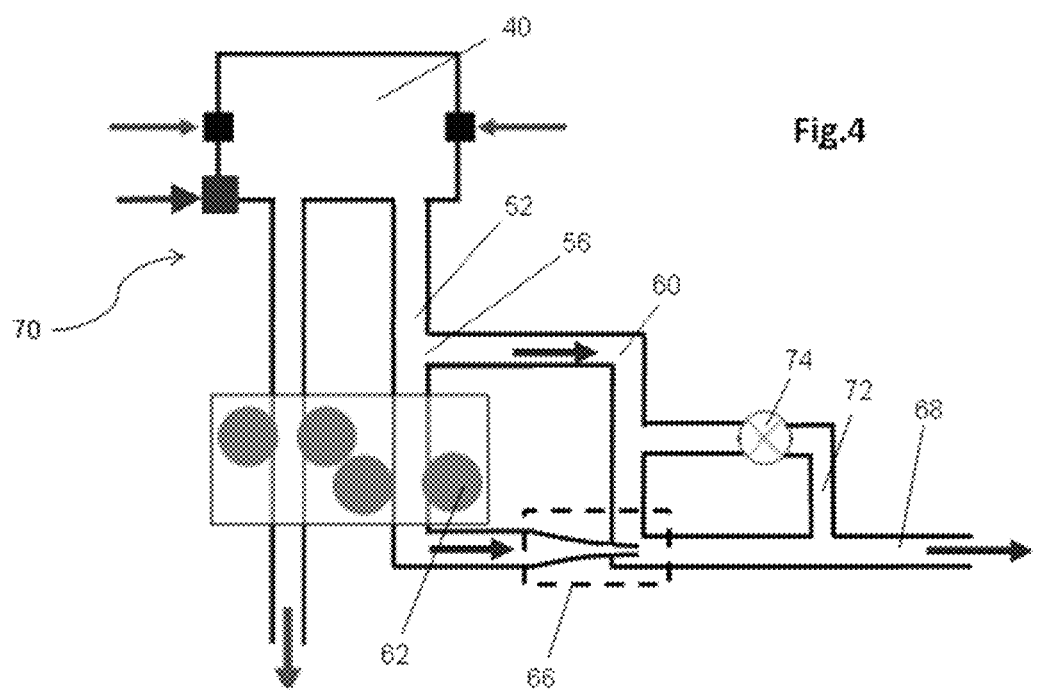
FIG. 4 is a schematic view showing another chamber fluid removal system according to an embodiment of the invention.

Referring now to FIG. 4 a chamber fluid removal system is generally provided at 70. Chamber fluid removal system 70 is the same as fluid removal system 39 with one exception. Like features have therefore been given like reference numerals.

Chamber fluid removal system 70 differs from system 39 in that a fluid bypass 72 is provided. The fluid bypass 72 is connected at one end to the entrained fluid line 60, intermediate the bifurcation point 56 and the entrained fluid port 68a of the ejector 66. At its other end the fluid bypass 72 is connected to the fluid exhaust path 68, thereby providing fluid communication between the two. Located within the fluid bypass 72 is a valve 74 capable closing the fluid bypass 72. In use actuation of the valve 74 is performed by an Engine Electronic Controller (EEC). In other embodiments however the valve 74 may be controlled by engine operation parameters, such as the differential pressure across the valve 74. The EEC opens the valve 74 to allow fluid to flow freely into or out of the chamber 40. Such flow may occur from the breather (not shown), via the fluid exhaust path 68, the fluid bypass 72, the entrained fluid line 60, the vent line 52 and the chamber outlet 54 to the interior of the chamber 40. Alternatively the flow may be in the opposite direction via the same components.

When the valve 74 is open, the pump 62 and ejector 66 are bypassed. This may in certain operational scenarios allow fluid to flow into chamber 40 from the exhaust path 68, and thereby increase the pressure therein relative to the pressure external to the chamber 40. This may be advantageous for reliability and service life of components such as the seals 44 and pump 62. In other operational scenarios the fluid bypass 72 may offer additional flow capacity to facilitate greater fluid removal from the chamber 40.

Referring now to FIG. 5, a chamber fluid removal system is generally shown at 100. The chamber fluid removal system 100 is arranged to remove fluid from a chamber 102 and a second chamber 104. Each chamber 102, 104 is similar to the chamber 40, having walls 106, seals 108 between a shaft (not shown) and the walls 106 and static joints 110.

In use the chamber fluid removal system 100 is used to remove fluid from the chambers 102, 104 so as to lower the internal pressure of the chambers 102, 104 with respect to the pressure external to the chambers 102, 104. In this way a constant flow of air from outside to inside the chambers 102, 104 may be achieved, thus reducing or preventing the leakage of oil from the inside to the outside of the chambers 102, 104 via the seals 108 and/or static joints 110.

Fluid to be used as a motive fluid is removed from the chamber 102 via a motive fluid line 112 in fluid communication with the chamber 102 via a motive fluid outlet 114. The fluid in the motive fluid line 112 is driven by a pump 116 positioned in the motive fluid line 112. The fluid enters an ejector 118 via a motive fluid port 120 in the ejector 118. Inside the ejector 118 the fluid passes through a convergent nozzle 121, increasing its velocity so as it may serve as the motive fluid. This reduces the pressure in an entrained fluid line 122 which is connected to the ejector 118 via an entrained fluid port (125). The reduction in pressure draws an entrained fluid through an entrained fluid outlet 124 of the second chamber 104, through the entrained fluid line 122 which is connected to the entrained fluid outlet 124 and into the ejector via the entrained fluid port 125. The entraining of the entrained fluid via the ejector 118 is the mechanism by which fluid is removed from the second chamber 104.

The velocity of the now mixed motive fluid and entrained fluid is reduced and the pressure increased. Thereafter the fluid passes along the fluid exhaust path 126 and is vented to atmosphere via the breather (not shown). The pump 116 therefore serves a double purpose. It removes a quantity of fluid from the chamber 102 via the motive fluid line 112 in accordance with the pump's capacity and it supplies motive fluid to ejector 120 to entrain fluid from the second chamber 104 via entrained fluid line 122. The net effect is increased fluid removal from the second chamber 104 without the need to employ an external source of high pressure fluid to serve as a motive fluid.

Oil dispensed in the chamber 102 to lubricate and cool the bearings is partially retrieved via the scavenge line 128, motivated by the scavenge pump 130. A similar scavenge line 128 and associated scavenge pump 130 are provided for the second chamber. The remaining proportion of the oil leaving each chamber 102, 104 may leave via the motive fluid line 112 and entrained fluid line 122 respectively.

First 132 and second 133 fluid bypasses (one associated with each chamber 102, 104) are also provided. The first fluid bypass 132 associated with the chamber 102 is connected to and in fluid communication with the motive fluid line 112. The first fluid bypass 132 allows the flow of fluid into chamber 102 from atmosphere or additional flow capacity out of chamber 102 depending on the operational scenario. The second fluid bypass 133 associated with the second chamber 104 is connected to and in fluid communication with the entrained fluid line 122. The second fluid bypass 133 allows the flow of fluid into second chamber 104 from atmosphere or additional flow capacity out of second chamber 104 depending on the operational scenario. First fluid bypass 132 is provided with a valve 134 which allows selective bypassing of the pump 116. Second fluid bypass 133 is provided with a valve 135 which allows selective bypassing of the ejector 118.

With reference to FIG. 6, the chamber fluid removal system 100 performs a method comprising the steps of pumping fluid from the chamber 102 to serve as a motive fluid and entraining fluid from the second chamber 104 using the motive fluid.

The embodiment of FIG. 5 may be extended to remove fluid from a third, fourth, fifth or more chambers. A second motive fluid line, containing a second pump could for example be connected to the entrained fluid line 122. The second pump would then pump additional fluid from the second bearing chamber 104, which itself might then serve as a second motive fluid for a second ejector arranged to entrain fluid consequently drawn from a third chamber. By repeating this pattern, fluid may be removed from multiple additional chambers.

It will be understood that the invention is not limited to the embodiments above-described and various modifications and improvements can be made without departing from the various concepts described herein. Any of the features may be employed separately or in combination with any other features and the invention extends to and includes all combinations and sub-combinations of one or more features described herein in any form of chamber fluid removal system.

The invention claimed is:

1. A chamber fluid removal system arranged, in use, to remove fluid from a chamber so as to lower an internal pressure of the chamber with respect to a pressure external to the chamber, the system comprising:
 a pump and an ejector,
 the system being arranged, in use, to pump fluid from the chamber using the pump and deliver the fluid from the chamber to the ejector as a motive fluid and
 the system being further arranged to draw fluid from the chamber as an entrained fluid by entraining the drawn fluid using the ejector and the motive fluid, and wherein the chamber is continuous such that it has a substantially homogeneous pressure, in use.

2. A chamber fluid removal system according to claim 1 where the fluid pumped from the chamber for use as the motive fluid passes through a motive fluid line arranged in use to be in fluid communication with the chamber, the pump and a motive fluid port of the ejector.

3. A chamber fluid removal system according to claim 1 where the pump is positioned intermediate the chamber and the ejector.

4. A chamber fluid removal system according to claim 1 where the entrained fluid drawn from the chamber using the ejector and motive fluid passes through an entrained fluid line arranged in use to be in fluid communication with the chamber from which the fluid is drawn and an entrained fluid port of the ejector.

5. A chamber fluid removal system according to claim 1 where the ejector has a fluid outlet in fluid communication with a fluid exhaust path.

6. A chamber fluid removal system according to claim 5 where a fluid bypass is provided arranged in use to be in fluid communication with the chamber and the fluid exhaust path.

7. A chamber fluid removal system according to claim 6 where a valve is provided in the fluid bypass.

8. A chamber fluid removal system according to claim 1 where the entrained fluid and the fluid pumped from the chamber by the pump for use as the motive fluid leave the chamber via a common fluid outlet connected to a common fluid line.

9. A gas turbine engine comprising one or more chamber fluid removal systems according to claim 1.

* * * * *